(No Model.)
J. E. WALKER.
CULTIVATOR ATTACHMENT.
No. 316,085. Patented Apr. 21, 1885.
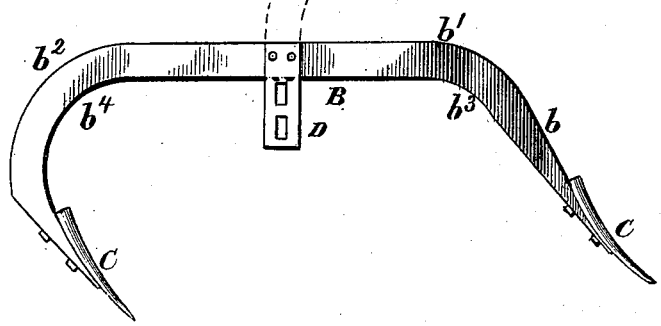
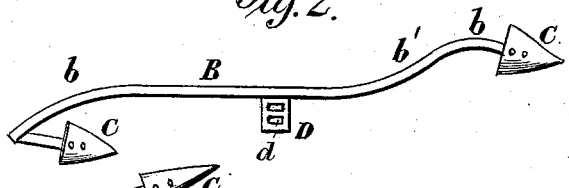
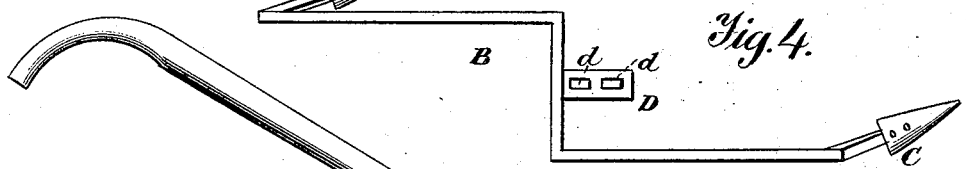
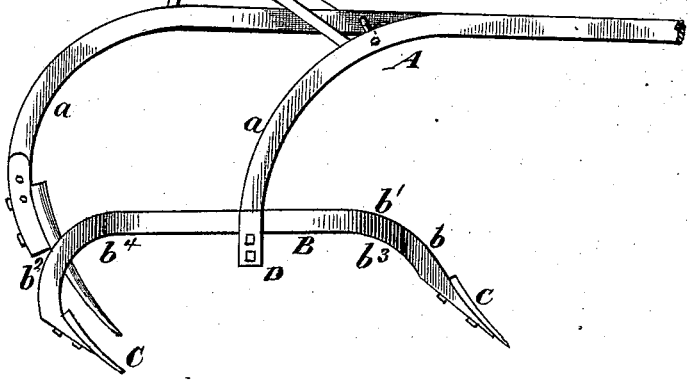
Witnesses.
A. Ruppert
Chas. St. V. Zimmermann
Inventor.
J. E. Walker,
Per
Thomas P. Simpson
Attorney.

UNITED STATES PATENT OFFICE.

JAMES EMMETT WALKER, OF CONWAY, IOWA.

CULTIVATOR ATTACHMENT.

SPECIFICATION forming part of Letters Patent No. 316,085, dated April 21, 1885.

Application filed July 8, 1884. (No model.)

*To all whom it may concern:*

Be it known that I, J. E. WALKER, residing at Conway, Taylor county, in the State of Iowa, have invented a Cultivator Attachment, of which the following is a specification.

The object of the invention is to connect shovels with the standards of a cultivator-frame so that the corn may be conveniently worked when young and small without danger of being torn up or covered with soil, also so that none of the ground between the rows of plants may be left uncultivated. The means which I employ to accomplish this result consist in attaching two small and narrow shovels to the front shank of each standard of a corn-cultivator, as hereinafter more particularly described, and pointed out in the claims.

Figure 1 of the drawings is a side elevation, and Figs. 2 and 4 plan views, while Fig. 3 is a side elevation, showing the application of my attachment to a cultivator-frame.

In the drawings, A represents the frame of a cultivator, which is shown in Fig. 3 of the drawings as made of iron, and in Fig. 4 as constructed of wood.

B represents my beam, bent at $b$ $b'$ $b^2$, as shown in Fig. 2, and at $b^3$ $b^4$, as shown in Fig. 3. It is provided at each end with a narrow shovel, C, made to form a very acute angle at the point, and turned to the right or left, according to which of the frame-standards $a$ $a$ it may be attached and on which side of the cultivator it is intended to be placed.

When I use my attachment with a wooden beam, as shown in Fig. 4 of the drawings, I modify the shape of my shovel-beam, but not so as to change the general effect and operation.

D represents a shank having one or more holes, $d$, through one of which passes either of the cultivator-standards $a$ $a$, to which said shank may be securely fastened in any approved way.

Having thus described all that is necessary to a full understanding of my invention, what I claim as new, and desire to protect by Letters Patent, is—

1. The beam B, bent at $b$ $b'$ $b^2$ $b^3$ $b^4$, substantially as shown, and provided with shovel-seats at the ends, substantially as and for the purpose described.

2. In a corn-cultivator, the combination of the standards $a$ $a$ and the bent beams B B, carrying at their ends the narrow shovels C C, the whole adapted to be used as and for the purpose set forth.

3. The shovel-beam B, constructed with a shank, D, having one or more holes, $d$, adapting it to receive the standards $a$ therethrough, substantially as shown and described.

JAMES EMMETT WALKER.

Witnesses:
ALBERT SMITH,
GEO. W. DEAN.